(12) United States Patent
Fukumoto

(10) Patent No.: US 12,475,788 B2
(45) Date of Patent: Nov. 18, 2025

(54) PARKING INFORMATION PROCESSING DEVICE, STORAGE MEDIUM FOR STORING COMPUTER PROGRAM FOR PROCESSING PARKING INFORMATION, METHOD FOR PROCESSING PARKING INFORMATION, PARKING INFORMATION PROCESSING SYSTEM, AND PARKING INFORMATION PROCESSING SERVER

(71) Applicant: TOYOTA JIDOSHA KABUSHIKI KAISHA, Toyota Aichi-ken (JP)

(72) Inventor: Kazuma Fukumoto, Taito-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 18/410,165

(22) Filed: Jan. 11, 2024

(65) Prior Publication Data
US 2024/0242609 A1 Jul. 18, 2024

(30) Foreign Application Priority Data
Jan. 12, 2023 (JP) ................................ 2023-003085

(51) Int. Cl.
*G08G 1/14* (2006.01)
(52) U.S. Cl.
CPC ............ *G08G 1/143* (2013.01); *G08G 1/146* (2013.01)
(58) Field of Classification Search
CPC ...... G08G 1/0112; G08G 1/143; G08G 1/146; G08G 1/147; G08G 1/0104; G08G 1/0129; G08G 1/0141; G08G 1/0175; G08G 1/04; G08G 1/09626; G08G 1/096716; G08G 1/096725; G08G 1/096775; G08G 1/123; G08G 1/127; G08G 1/205; G08G 1/00; G08G 3/00; G08G 5/00; G08G 7/00;
(Continued)

(56) References Cited

U.S. PATENT DOCUMENTS

| 8,498,808 | B2 * | 7/2013 | Vavrus | G08G 1/144 |
| | | | | 701/428 |
| 2002/0161520 | A1 * | 10/2002 | Dutta | G01C 21/26 |
| | | | | 342/357.31 |

(Continued)

FOREIGN PATENT DOCUMENTS

JP 2018041176 A 3/2018
JP 2020-101473 A 7/2020
(Continued)

*Primary Examiner* — Daniel Previl
(74) *Attorney, Agent, or Firm* — Dinsmore & Shohl LLP

(57) ABSTRACT

A parking information processing device includes a processor configured to acquire restriction information representing a current restricted area where parking is restricted in a parking lot having no parking frames at an entrance/exit of the parking lot from a server via a device communication unit, determine a first parking position for parking a host vehicle in the parking lot based on terrain information representing terrain of the parking lot and the restriction information, generate area information including a first traveling route for the host vehicle traveled from the entrance/exit of the parking lot to the first parking position and the first parking position as a new restricted area, and output the area information to the server via the device communication unit.

11 Claims, 13 Drawing Sheets

(58) Field of Classification Search
CPC . G08G 9/00; G08G 99/00; B60N 2/00; B60N 3/00; B60N 5/00; B60N 99/00; B60N 2205/00; B60N 2210/00; B60N 2220/00; B60N 2230/00; F21S 41/13; F21S 2/00; F21S 4/00; F21S 6/00; F21S 8/00; F21S 9/00; F21S 10/00; F21S 11/00; F21S 13/00; F21S 15/00; F21S 19/00; F21S 41/00; F21S 43/00; F21S 45/00; F21S 2217/00; F21S 2243/00; G01C 21/1652; G01C 21/1656; G01C 21/3811; G01C 21/3841; G01C 21/3848; G01C 1/00; G01C 3/00; G01C 5/00; G01C 7/00; G01C 9/00; G01C 11/00; G01C 13/00; G01C 15/00; G01C 17/00; G01C 19/00; G01C 21/00; G01C 22/00; G01C 23/00; G01C 25/00; G01S 13/765; G01S 19/485; G01S 1/00; G01S 3/00; G01S 5/00; G01S 7/00; G01S 11/00; G01S 13/00; G01S 15/00; G01S 17/00; G01S 19/00; G01S 2201/00; G01S 2205/00; G06F 16/29; G06F 2219/10; G06F 1/00; G06F 3/00; G06F 5/00; G06F 7/00; G06F 8/00; G06F 9/00; G06F 11/00; G06F 12/00; G06F 13/00; G06F 15/00; G06F 16/00; G06F 17/00; G06F 18/00; G06F 21/00; G06F 30/00; G06F 40/00; G06F 2101/00; G06F 2111/00; G06F 2113/00; G06F 2115/00; G06F 2117/00; G06F 2119/00; G06F 2123/00; G06Q 30/04; G06Q 10/00; G06Q 20/00; G06Q 30/00; G06Q 40/00; G06Q 50/00; G06Q 90/00; G06Q 99/00; G06Q 2220/00; G06Q 2230/00; G06Q 2240/00; G06Q 2250/00; G06T 17/05; G06T 1/00; G06T 5/00; G06T 3/00; G06T 7/00; G06T 9/00; G06T 11/00; G06T 13/00; G06T 15/00; G06T 17/00; G06T 19/00; G06T 2200/00; G06T 2201/00; G06T 2207/00; G06T 2210/00; G06T 2211/00; G06T 2213/00; G06T 2215/00; G06T 2219/00; G06V 20/56; G06V 10/00; G06V 20/00; G06V 30/00; G06V 40/00; G06V 2201/00; G07B 15/02; G07B 15/063; G07B 1/00; G07B 3/00; G07B 5/00; G07B 7/00; G07B 9/00; G07B 11/00; G07B 13/00; G07B 15/00; G07B 17/00; G07C 5/008; G07C 9/28; G07C 1/00; G07C 3/00; G07C 5/00; G07C 7/00; G07C 9/00; G07C 11/00; G07C 13/00; G07C 15/00; G07C 2205/00; G07C 2209/00

USPC .... 340/932.2, 935, 949, 951, 973, 991–994, 340/995.12, 995.19, 995.28, 426.22, 438, 340/459, 488

See application file for complete search history.

(56) References Cited

U.S. PATENT DOCUMENTS

| | | | |
|---|---|---|---|
| 2009/0164119 A1* | 6/2009 | Sakata | G08G 1/096844 |
| | | | 701/533 |
| 2018/0068564 A1* | 3/2018 | Tanigawa | G06T 7/73 |
| 2018/0370566 A1* | 12/2018 | Kojo | G06V 20/586 |
| 2019/0130349 A1* | 5/2019 | Ferguson | G06Q 10/08355 |
| 2020/0143140 A1* | 5/2020 | Sakanashi | G08G 1/146 |
| 2020/0198622 A1* | 6/2020 | Tagawa | B60W 30/06 |
| 2020/0211071 A1* | 7/2020 | Rosas-Maxemin | |
| | | | G06Q 30/0284 |
| 2021/0287542 A1* | 9/2021 | Maruiwa | B60K 35/10 |

FOREIGN PATENT DOCUMENTS

| | | |
|---|---|---|
| JP | 2020117038 A | 8/2020 |
| WO | 2017104164 A1 | 6/2017 |
| WO | 2018225177 A1 | 12/2018 |

* cited by examiner

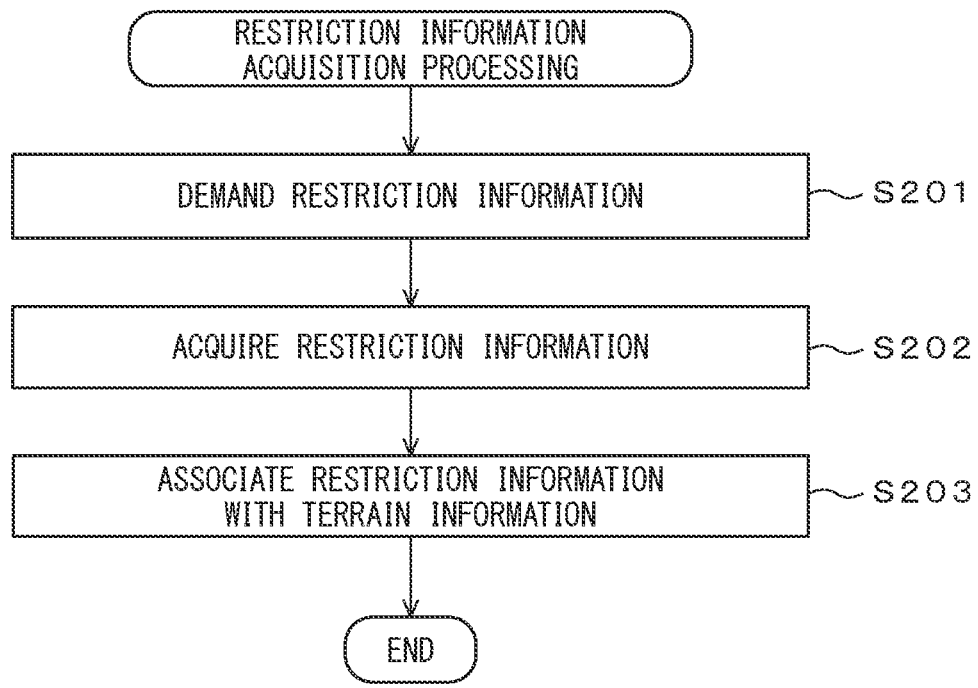

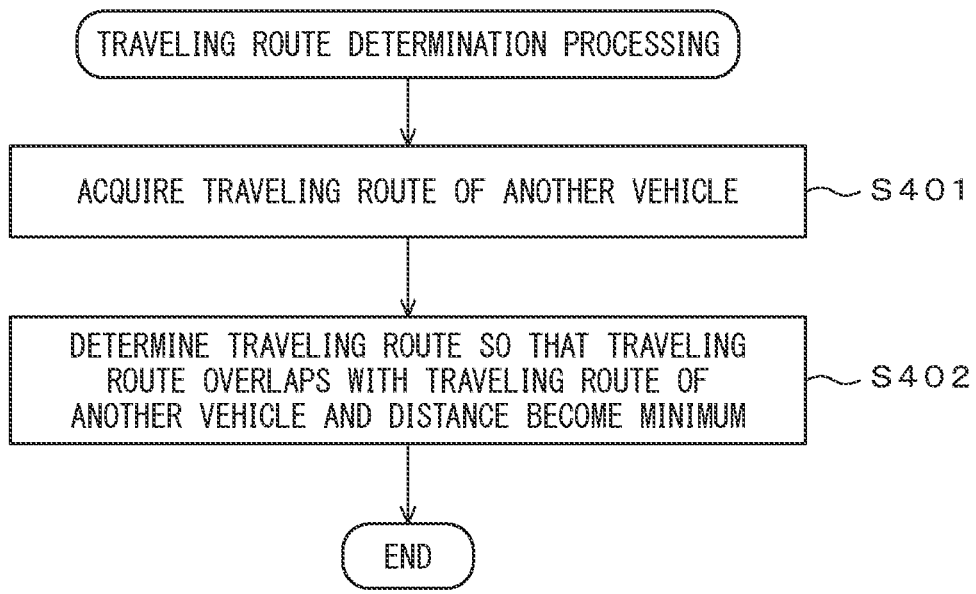
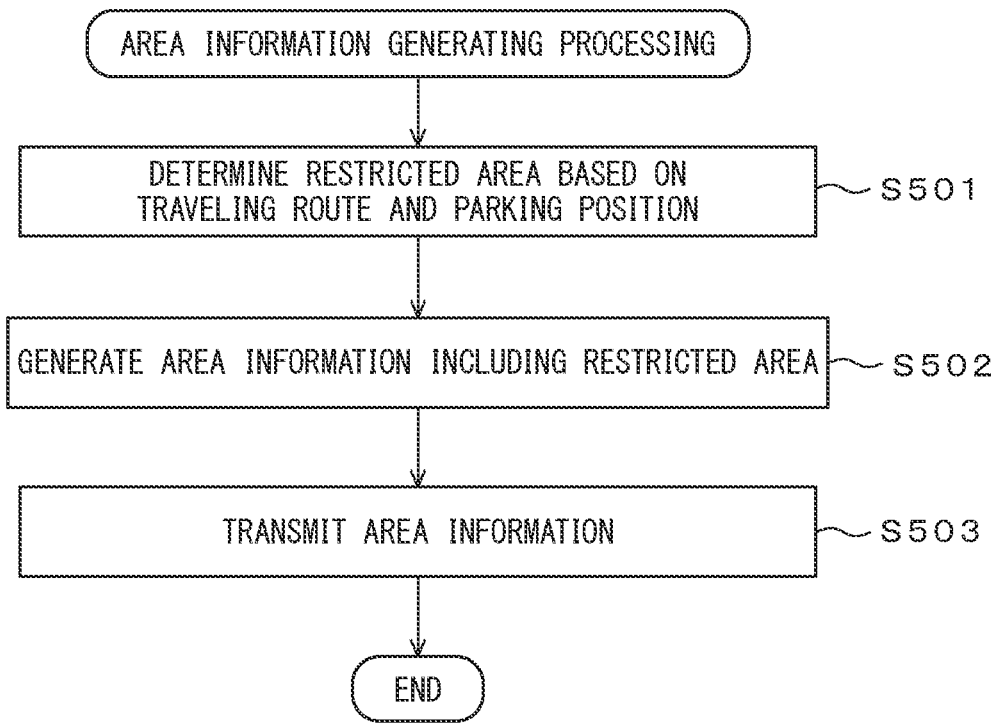

PARKING INFORMATION PROCESSING DEVICE, STORAGE MEDIUM FOR STORING COMPUTER PROGRAM FOR PROCESSING PARKING INFORMATION, METHOD FOR PROCESSING PARKING INFORMATION, PARKING INFORMATION PROCESSING SYSTEM, AND PARKING INFORMATION PROCESSING SERVER

CROSS REFERENCE TO RELATED APPLICATIONS

This application is based upon and claims the benefit of priority from Japanese patent application No. 2023-003085, filed on Jan. 12, 2023, the disclosure of which is incorporated herein in its entirety by reference.

FIELD

The present disclosure relates to a parking information processing device, storage medium for storing computer program for processing parking information, method for processing parking information, parking information processing system and parking information processing server.

BACKGROUND

An automatic control system for a vehicle selects a parking frame where another vehicle is not parking as a parking position and moves a host vehicle to the parking position to park the host vehicle when the host vehicle is to be parked in a parking lot having parking frames (see, for example, PCT International Publication No. WO2017/104164).

Some parking lots have no parking frames. For example, when vacant lots are temporarily used as a parking lot at the time of event-holding, there are many cases in which there are no parking frames.

When a host vehicle is to be parked in the parking lot having no parking frames, the automatic control system selects a space where the host vehicle can be parked as the parking position at the entrance/exit of the parking lot. The automatic control system moves the host vehicle to the parking position so as not to hit another vehicle which has already been parked and parks the host vehicle.

SUMMARY

The automatic control system determines the parking position of the host vehicle without considering the traveling route on which another vehicle which has already been parked exits the parking lot. There is a case in which the parking position of the host vehicle is determined on the traveling route on which another vehicle will travel from the parking position to the entrance/exit of the parking lot.

When another vehicle tries to exit from the parking lot, another vehicle may move from the parking position to the entrance/exit of the parking lot using the same traveling route as the route used for traveling from the entrance/exit to the parking position. In this situation, if the host vehicle is parked on the traveling route for another vehicle traveled from the entrance/exit to the parking position, the host vehicle may obstruct another vehicle exiting from the parking lot.

It is an object of the present disclosure to provide a parking information processing device that is capable of parking the host vehicle in the parking lot having no parking frames so as not to obstruct the exiting of another vehicle that has already been parked from the parking lot.

(1) According to one embodiment, a parking information processing device is provided. The parking information processing device has a processor configured to acquire restriction information representing a current restricted area where parking is restricted in a parking lot having no parking frames at an entrance/exit of the parking lot from a server via a device communication unit, determine a first parking position for parking a host vehicle in the parking lot based on terrain information representing terrain of the parking lot and the restriction information, generate area information including a first traveling route for the host vehicle traveled from the entrance/exit of the parking lot to the first parking position and the first parking position as a new restricted area, and output the area information to the server via the device communication unit.

(2) In the parking information processing device of (1), in embodiments, the restriction information includes a second traveling route for another vehicle traveled from the entrance/exit of the parking lot to a second parking position where another vehicle is parking and the second parking position as the current restricted area, and the processor is further configured to determine the first parking position not to overlap with the second traveling route and the second parking position.

(3) In the parking information processing device of (2), in embodiments, the processor is further configured to determine the first parking position not to overlap with the second traveling route and the second parking position within a predetermined range from the second parking position.

(4) In the parking information processing device of (2), in embodiments, the processor is further configured to determine the first traveling route so that an overlapping portion of the first traveling route with the second traveling route becomes maximum, the distance for the host vehicle traveling from the entrance/exit of the parking lot to the first parking position becomes minimum, and the first traveling route does not overlap with the second parking position.

(5) In the parking information processing device of (2), the processor is further configured to estimate an orientation of another vehicle parking in the parking lot based on the current restriction information and determine the first parking position so that the vehicle parks facing the same direction as another parking vehicle.

(6) In any one of the parking information processing devices of (1) to (5), in embodiments, the processor is further configured to expand the first parking position and the first traveling route based on accuracy of the position of the host vehicle to generate the new restricted area.

(7) Also according to other embodiments, there is provided a non-temporary storage medium for storing a computer program for parking information processing that is readable by the computer. This computer program for parking information processing causes a processor to execute a process, and the process includes acquiring restriction information representing a current restricted area where parking is restricted in a parking lot having no parking frames at an entrance/exit of the parking lot from a server via a device communication unit, determining a first parking position for parking a host vehicle in the parking lot based on terrain information representing terrain of the parking lot and the restriction information, generating area information including a first traveling route for the host vehicle traveled from the entrance/exit of the parking lot to the first parking position and the first parking position as a new restricted area, and outputting the area information to the server via the device communication unit.

(8) According to another embodiment, a parking information processing method is provided. This parking information processing method is carried out by a parking information processing device, and the method includes acquiring restriction information representing a current restricted area where parking is restricted in a parking lot having no parking frames at an entrance/exit of the parking lot from a server via a device communication unit, determining a first parking position for parking a host vehicle in the parking lot based on terrain information representing terrain of the parking lot and the restriction information, generating area information including a first traveling route for the host vehicle traveled from the entrance/exit of the parking lot to the first parking position and the first parking position as a new restricted area, and outputting the area information to the server via the device communication unit.

(9) According to yet another embodiment, a parking information processing system is provided. This the parking information processing system has a server which has a server communication device, a storage device storing restriction information representing a current restricted area where parking is restricted in a parking lot having no parking frames, and a first processor configured to output the restriction information stored in the storage device via the server communication device, acquire area information representing a new restricted area via the server communication device, and update the restriction information stored in the storage device based on the area information, and a parking information processing device which has a second processor configured to acquire the restriction information at an entrance/exit of the parking lot from the server via a device communication unit, determine a first parking position for parking a host vehicle in the parking lot based on terrain information representing terrain of the parking lot and the restriction information, generate the area information including a first traveling route for the host vehicle traveled from the entrance/exit of the parking lot to the first parking position and the first parking position as a new restricted area, and output the area information to the server via the device communication unit.

(10) According to yet another embodiment, a parking information processing server is provided. This parking information processing server has a server communication device, a storage device storing restriction information representing a current restricted area where parking is restricted in a parking lot having no parking frames, and a processor configured to output the restriction information stored in the storage device via the server communication device, acquire area information including a traveling route for a vehicle traveled from the entrance/exit of the parking lot to a parking position and the parking position as a new restricted are via the server communication device, and update the restriction information stored in the storage device based on the area information.

The parking information processing device of the present disclosure can park the host vehicle not to park the host vehicle on the traveling route for another vehicle which has already been parked exiting from the parking lot having no parking frames and has an effect of not obstructing another vehicle exiting from the parking lot.

The object and advantages of the disclosure will be realized and attained by means of the elements and combinations particularly pointed out in the claims. It is to be understood that both the foregoing general description and the following detailed description are exemplary and explanatory, and are not restrictive of the disclosure, as claimed.

BRIEF DESCRIPTION OF DRAWINGS

FIG. 5 is an exemplary operation flow chart relating to restriction information acquisition processing of the parking information processing device.

FIG. 6 is a diagram for explaining the restriction information (Part 1).

FIG. 9 is an exemplary operation flow chart relating to traveling route determination processing of the parking information processing device.

FIG. 10 is an exemplary operation flow chart relating to area information generating processing of the parking information processing device.

DETAILED DESCRIPTION

Figure 1:
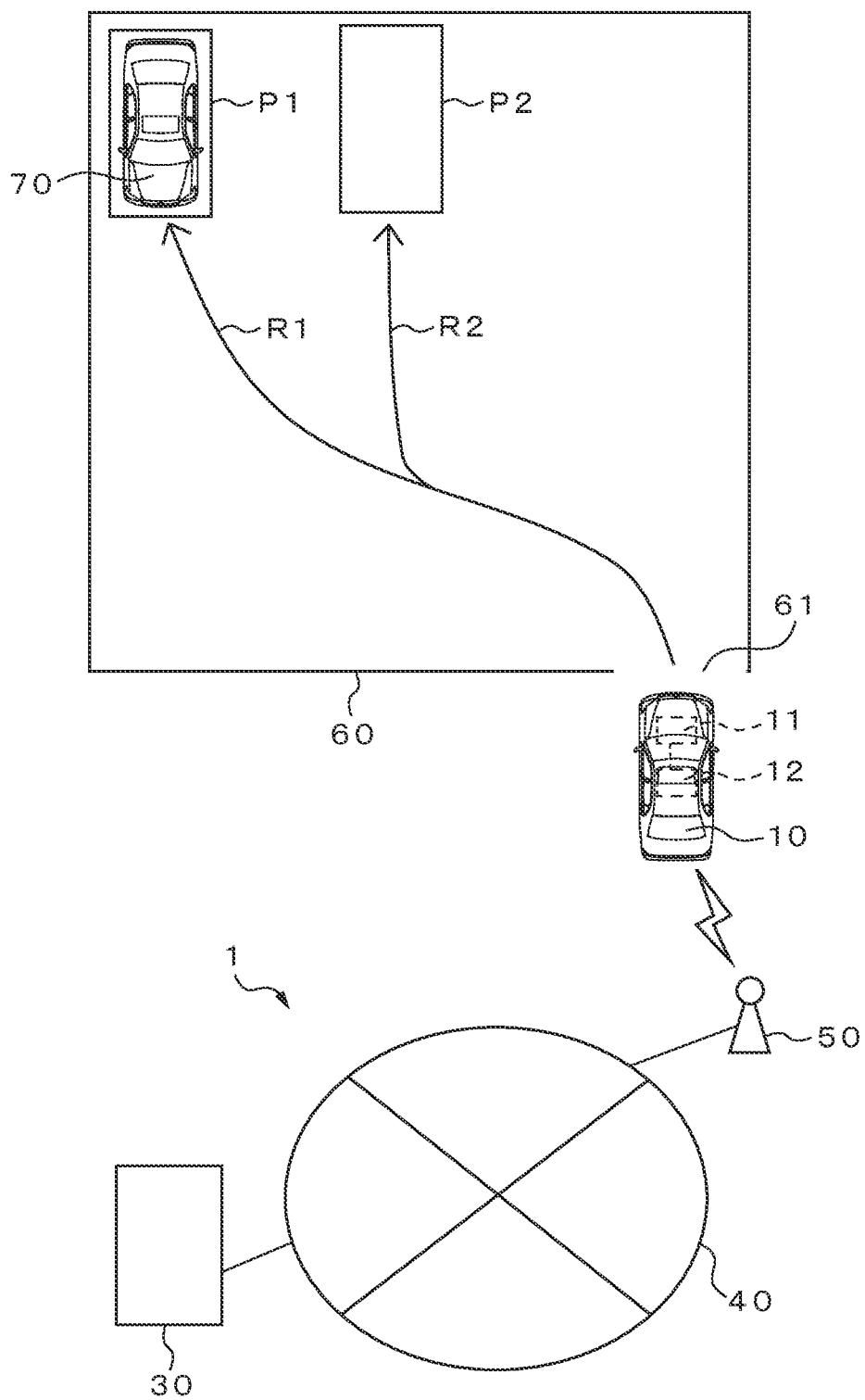
FIG. 1 is a diagram illustrating an outline of a parking information processing system in which a parking information processing device of the present embodiment is mounted.

FIG. 1 is a diagram illustrating an outline of a parking information processing system 1 in which a parking information processing device 11 of the present embodiment is mounted. The parking information processing system 1 of the present embodiment has at least one vehicle 10 and a server 30. The parking information processing device 11 is mounted in the vehicle 10. The vehicle 10 is connected to the server 30 via the wireless base station 50 (hereinafter also referred to as a macrocell base station 50) and the communication network 40, for example, by accessing the macrocell base station 50 that provides macrocell connected to the communication network 40 to which the server 30 is connected via a gateway (not shown) or the like. The server 30 is an exemplary parking information processing server.

In FIG. 1, although only one vehicle 10 is shown, the parking information processing system 1 may have a plurality of the vehicles. Similarly, a plurality of the macrocell base stations 50 may be connected to the communication network 40.

Figure 2:
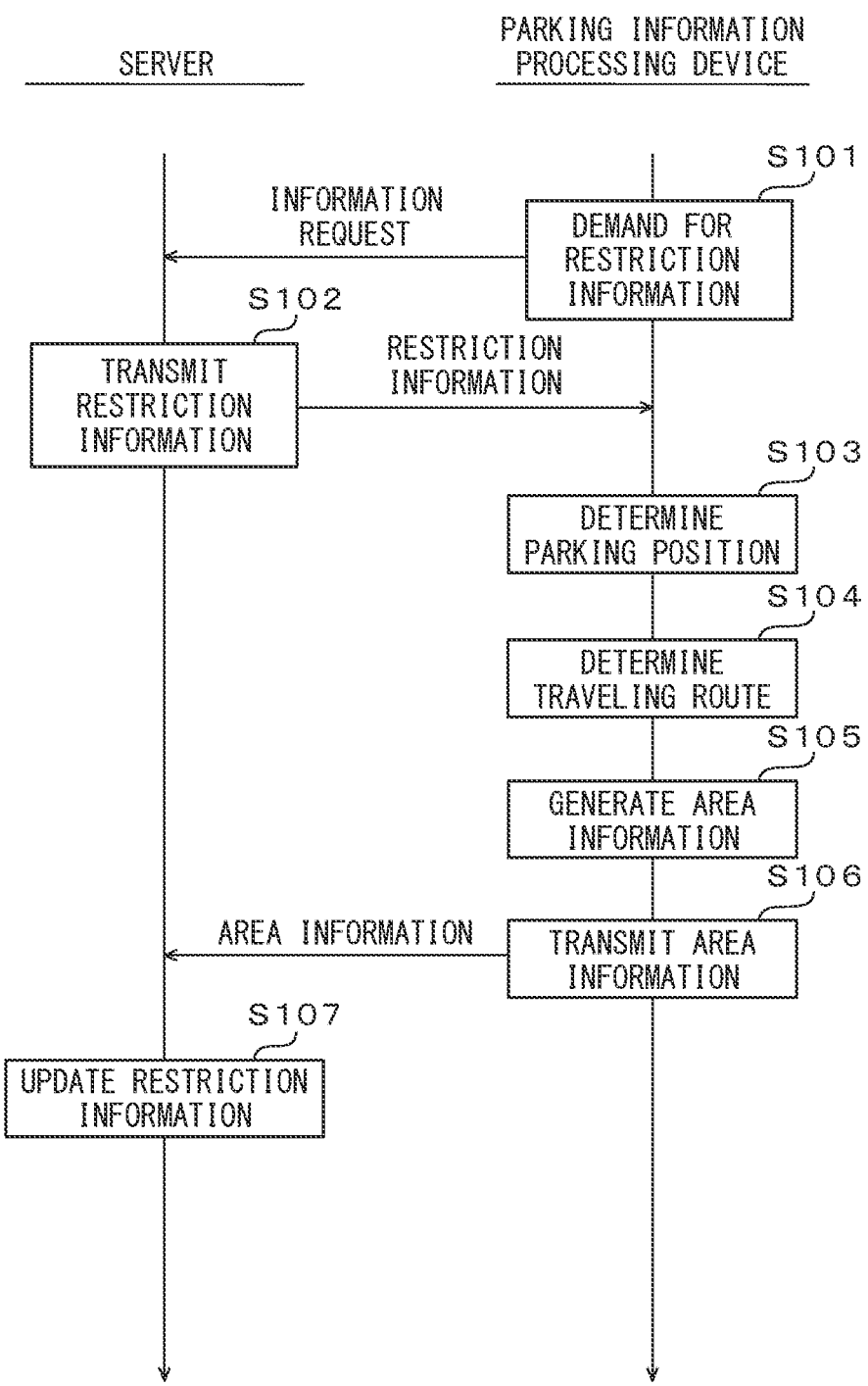
FIG. 2 is a sequential diagram of the parking information processing of the parking information processing system.

FIG. 2 is a sequential diagram of the parking information processing of the parking information processing system 1. The parking information processing system 1 carries out the parking information processing in accordance with the sequential diagram shown in FIG. 2 each time the vehicle 10 parks in the parking lot 60 without the parking frames. In FIG. 1, although only one parking lot 60 is illustrated, it is possible that the parking information processing system 1 carries out the parking information processing, even when the vehicle 10 parks in another parking lot without the parking frames.

The parking lot 60 is a case in which vacant spaces are temporarily used as the parking lot at the time of events, etc. The parking lot 60 has no parking frames. The vehicle 10 searches for a space in the parking lot 60 to determine the parking position P2. Further, the parking lot 60 has an entrance/exit 61 which is used for both of an entrance and exit. The vehicle 10 enters and exits the parking lot 60 through the entrance/exit 61.

The vehicle 10 has the parking information processing device 11 and an automatic control device 12. The automatic control device 12 uses sensor such as a camera to detect the environment of the vehicle 10 to drive the vehicle 10. For example, the vehicle 10 is an autonomous vehicle.

First, when the vehicle 10 arrives at the entrance/exit 61 of the parking lot 60 having no parking frames, the parking information processing device 11 transmits an information request demanding for restriction information representing a current restricted area where parking is restricted within the parking lot 60 to the server 30 via the macrocell base station 50 and the communication network 40 (step S101).

The server 30 then transmits the restriction information of the parking lot 60 to the parking information processing device 11 via the communication network 40 and the macrocell base station 50 (step S102). When the server 30 stores the restriction information of a plurality of the parking lot having no parking frames, each of the plurality of the restriction information is, in embodiments, identified using the identifying information to identify the parking lot.

In the example shown in FIG. 1, the restriction information includes the traveling route R1 for another vehicle 70 traveled from the entrance/exit 61 of the parking lot 60 to the parking position P1 where the vehicle 70 is parking and the parking position P1, as the current restricted area.

Next, the parking information processing device 11 determines the parking position P2 to park the vehicle 10 in the parking lot 60 based on terrain information representing the terrain of the parking lot (e.g., the map information) and the restriction information (step S103). The terrain information representing the terrain of the parking lot may be received together with the restriction information from the server 30. The parking information processing device 11 determines the parking position P2 so that the parking position P2 does not overlap with the traveling route R1 and the parking position P1.

Next, the parking information processing device 11 generates a traveling route R2 for the vehicle 10 traveling from the entrance/exit 61 of the parking lot 60 to the parking position P2 based on the terrain information representing the terrain of the parking lot and the restriction information (step S104). Then, the automatic control device 12 drives the vehicle 10 from the entrance/exit 61 of the parking lot 60 to the parking position P2 based on the traveling route R2 to park the vehicle 10 in the parking position P2. The parking position P2 is a position that does not obstruct the vehicle 70 exiting the parking lot 60.

Next, the parking information processing device 11 generates area information including the traveling route R2 and the parking position P2 for the vehicle 10 traveled from the entrance/exit 61 of the parking lot 60 to the parking position P2 as a new restricted area (step S105).

The parking information processing device 11 then transmits the area information to the server 30 via the macrocell base station 50 and the communication network 40 (step S106).

The server 30 then updates the restriction information based on the received area information (step S107).

The parking information processing system 1 of the present embodiment described above can park the vehicle 10 not to park the vehicle 10 on the traveling route R1 for the vehicle 70 which has already been parked exiting from the parking lot 60 having no parking frames and not to obstruct the vehicle 70 exiting from the parking lot.

The parking information processing system 1 may include a plurality of vehicles 10, 70, but one vehicle 10 will be described below since each vehicle may have the same configuration and carries out the same processing with respect to the parking information processing.

Figure 3:
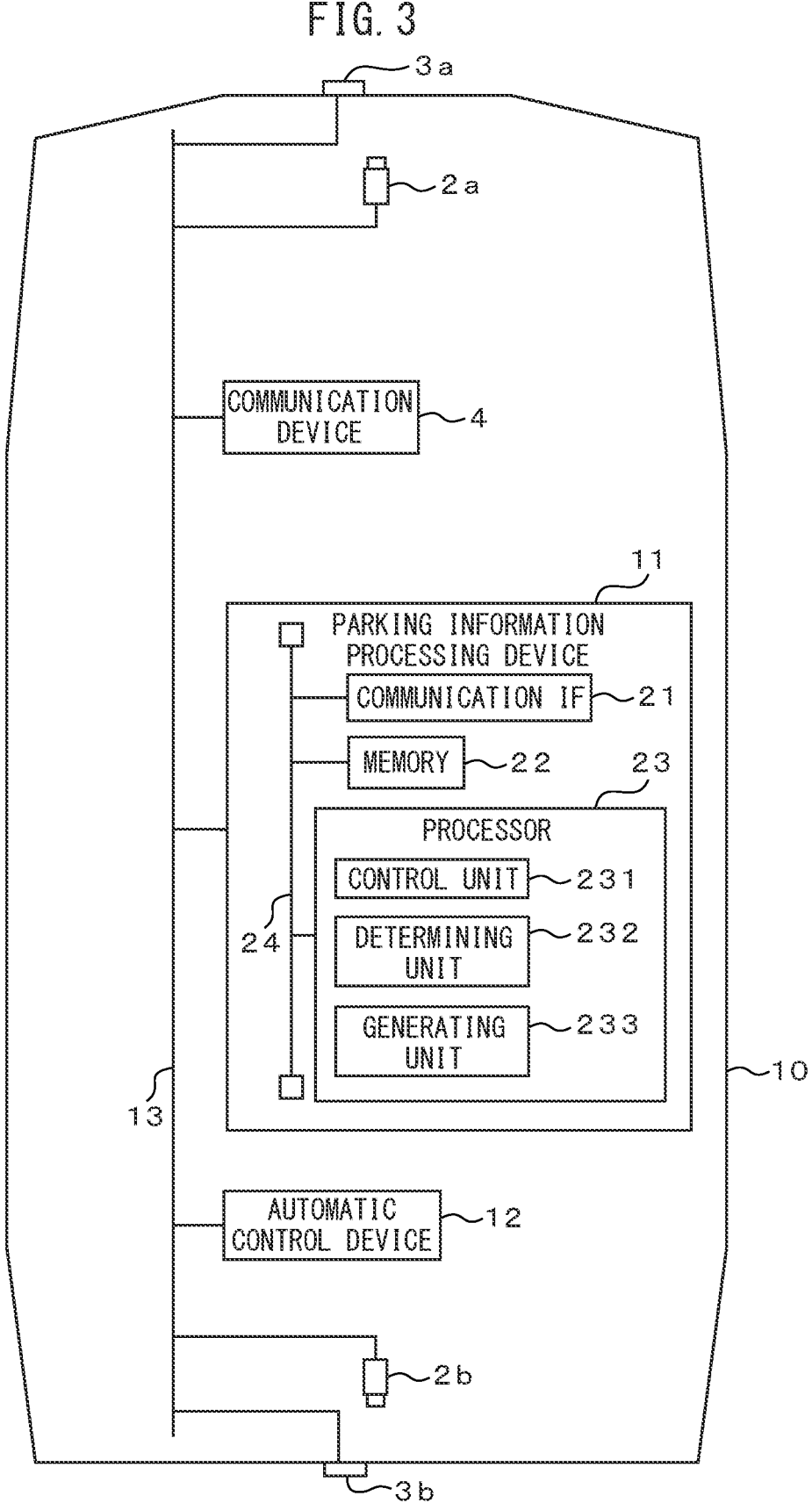
FIG. 3 is diagram illustrating an outline of a vehicle in which the parking information processing device is mounted.

Next, the vehicle 10 on which the parking information processing device 11 is mounted will be described below with reference to FIG. 3. FIG. 3 is a diagram illustrating an outline of the vehicle 10 in which the parking information processing device 11 is mounted.

The vehicle 2 has cameras 2a, 2b, LiDAR sensors 3a, 3b, a communication device 4, the parking information processing device 11, the automatic control device 12, and the like.

The cameras 2a, 2b, the LiDAR sensors 3a, 3b, the communication device 4, the parking information processing device 11, and the automatic control device 12 are communicatively connected through the in-vehicle network 13. The in-vehicle network 13 conforms to controller area network standards.

The camera 2a is mounted to the vehicle 10 so as to face the front of the vehicle 10. The camera 2a captures camera images, for example, at a predetermined cycle, in which the environment of a predetermined area ahead of the vehicle 10 is represented. The camera image may represent road and road features such as lane marking lines on the road surface thereof included within the predetermined area ahead of the vehicle 10. Another vehicle located in front of the vehicle 10 may be represented in the camera image captured by the camera 2a.

The camera 2b is mounted to the vehicle 10 so as to face the rear of the vehicle 10. The camera 2b captures camera images, for example, at the same cycle as the camera 2a, where the environment of a predetermined area behind the vehicle 10 are represented. The camera image may represent road and road features such as lane marking lines on the road surface thereof included within the predetermined area behind the vehicle 10. Another vehicle located behind the vehicle 10 may be represented in the camera image captured by the camera 2b.

Each of the cameras 2a, 2b has a two-dimensional detector configured with an array of photoelectric conversion elements sensitive to visible light, such as a CCD or C-MOS, and an imaging optical system for capturing an image of an area to be focused on the two-dimensional detector. The camera image is an example of environmental information representing the environment in front of and behind the vehicle 10.

Each of the cameras 2a, 2b outputs the camera image and the camera image capturing time to the automatic control device 11, etc. through the in-vehicle network 13 each time the camera image is captured. The camera image is used in the automatic control device 11 to detect objects around the vehicle 10.

The LiDAR sensor 3*a* is attached to the outer surface of the vehicle 10 so as to face the front of the vehicle 10. The LiDAR sensor 3*a* emits the pulsed laser so as to scan the front of the vehicle 10 at the reflection wave information acquisition time which is set at a predetermined cycle. The LiDAR sensor 3*a* receives the reflection wave reflected by the reflective object. The LiDAR sensor 3*b* is attached to the outer surface of the vehicle 10 so as to face the rear of the vehicle 10. The LiDAR sensor 3*b* emits the pulsed laser so as to scan the rear of the vehicle 10 at the reflection wave information acquisition time which is set as the same predetermined cycle as the LiDAR sensor 3*a*. The LiDAR sensor 3*b* receives the reflection wave reflected by the reflective object.

The time taken for the reflected wave to return has distance information between other objects located in the direction in which the laser is emitted and the vehicle 10. The LiDAR sensors 3*a*, 3*b* output the reflection wave information together with the reflection wave information acquisition time to the automatic control device 11 through the in-vehicle network 13. The reflection wave information includes the emitted direction of the laser and the time required for the reflected wave to return. The reflection wave information is used in the automatic control device 11 to detect objects around the vehicle 10.

The communication device 4 is an exemplary device communication unit and has interface circuitry for connecting the parking information processing device 11 to the macrocell base station 50. The communication device 4 is configured to communicate with the server 30 via the macrocell base station 50 and the communication network 40.

The parking information processing device 11 carries out control processing, determination processing, and generation processing. For this purpose, the parking information processing device 11 has a communication interface (IF) 21, a memory 22, and a processor 23. The communication IF 21, the memory 22, and the processor 23 are connected via a signal wire 24. The communication IF 21 has interface circuitry for connecting the parking information processing device 11 to the in-vehicle network 13.

The memory 22 is an exemplary a storage unit, and it has a volatile semiconductor memory and a non-volatile semiconductor memory, for example. The memory 22 stores application computer programs and various data to be used for information processing carried out by the processor 23.

All or some of the functions of the parking information processing device 11 are, for example, functional modules implemented by computer programs operating on the processor 23. The processor 23 includes a control unit 231, a determining unit 232, and a generating unit 233. The processor 23 includes one or more CPUs (Central Processing Units) and their peripheral circuits. The processor 23 may also have other computing circuits such as a logical operation unit, numerical calculation unit or graphic processing unit. Alternatively, the functional module of the processor 23 may be a dedicated computing circuit provided in the processor 23. The parking information processing device 11 is, for example, an electronic control Unit (ECU). The operation of the parking information processing device 11 will be described later.

The automatic control device 12 controls operations including the traveling of the vehicle 10. The automatic control device 12 detects objects surrounding the vehicle 10 based on the camera images and reflection wave information. The automatic control device 12 generates an operation plan that controls operation such as steering, driving and braking, etc., based on the map information including the present position of the vehicle 10 and information representing an object detected around the vehicle 10. The automatic control device 12 drives the vehicle 10 by outputting an automatic control signal based on the operation plan to an actuator for controlling the steering wheels (not shown), a drive unit (not shown) or a brake (not shown) through the in-vehicle network 13.

In FIG. 3, the parking information processing device 11 and the automatic control device 12 are described as separate devices, but all these devices may be configured as one device.

Figure 4:
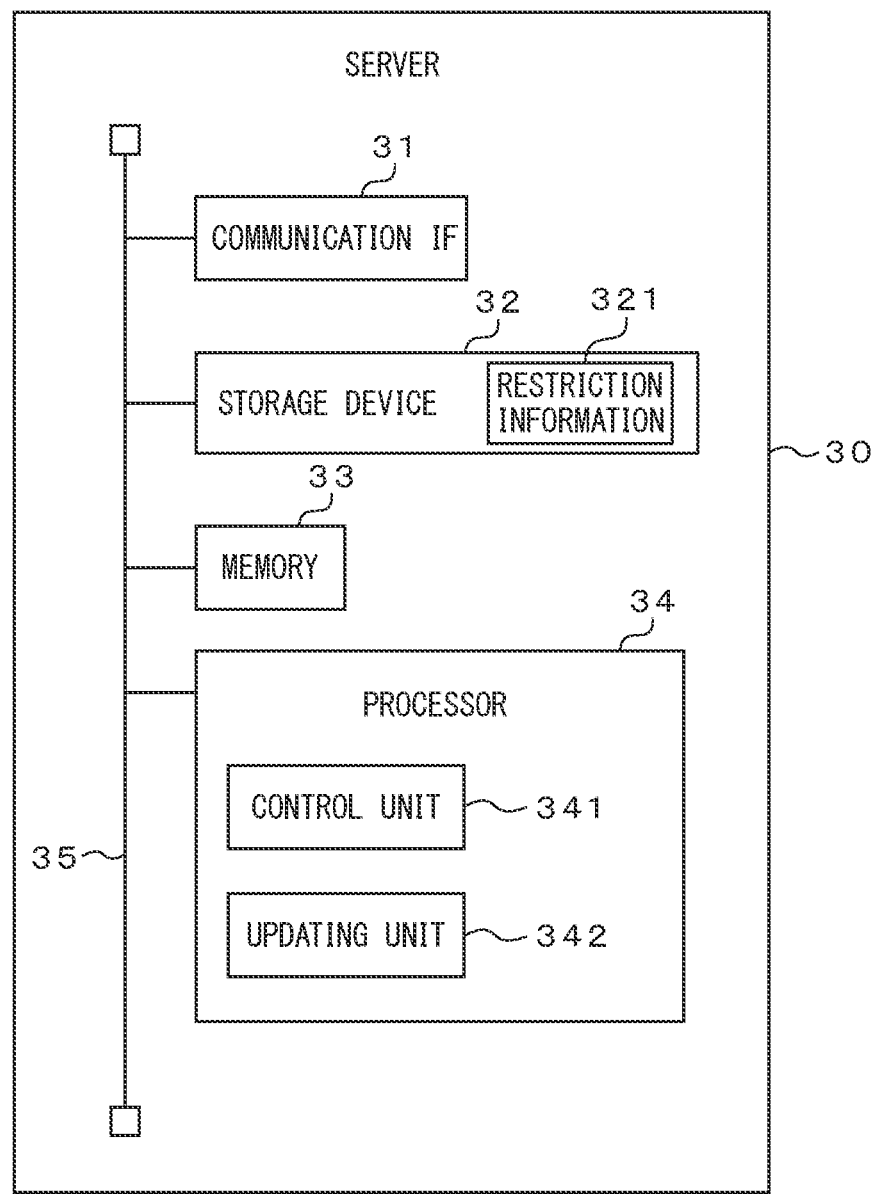
FIG. 4 is a hardware configuration diagram of a server.

FIG. 4 is a hardware configuration diagram of a server. 30 The server 30 carries out control processing and updating processing. For this purpose, the server 30 has a communication interface (IF) 31, a storage device 32, a memory 33, and a processor 34. The communication IF 31, the storage device 32, the memory 33 and the processor 34 are connected via a signal wire 35. The server 30 may further has an input device, such as a keyboard and mouse, and a display device, such as a liquid crystal display.

The communication IF 31 has interface circuitry for connecting the server 30 to the communication network 40. The communication IF 31 is configured to communicate with the vehicle 10 via the communication network 40 and the macrocell base station 50. The communication IF 31 is an exemplary server communication unit.

The storage device 32 has, for example, a hard disk device or an optical storage medium and its accessing device. The storage device 32 stores the restriction information 321, etc. to be updated by the processor 34. The restriction information is stored in the storage device 32 for each of the parking lots. The restriction information can be identified by an identifying information that identifies the parking lot. The storage device 32 may further store identifying information for identifying the vehicle 10. Additionally, the storage device 32 may store computer programs for carrying out processing of the server 30 associated with the parking information processing carried out on the processor 34. The storage device 32 is an exemplary storage unit.

The memory 33 has a volatile semiconductor memory and a non-volatile semiconductor memory, for example. The memory 33 stores application computer programs and various data to be used for information processing carried out by the processor 34. The restriction information may be stored in the memory 33. The memory 33 is an exemplary storage unit.

All or some of the functions of the server 30 are, for example, functional modules implemented by computer programs operating on the processor 34. The processor 34 has a control unit 341 and an updating unit 342. The control unit 341 is an exemplary server output unit. Alternatively, the functional module of the processor 34 may be a dedicated computing circuit provided in the processor 34. The processor 34 includes one or more CPUs (Central Processing Units) and their peripheral circuits. The processor 34 may also have other computing circuits such as a logical operation unit, numerical calculation unit or graphic processing unit. The operation of the server 30 will be described later.

FIG. 5 is an exemplary operation flow chart relating to restriction information acquisition processing of the parking information processing device 11. When the vehicle 10 arrives at the entrance/exit 61 of the parking lot 60 having no parking frames, the parking information processing device 11 carries out the restriction information acquisition processing according to the operation flow chart shown in FIG. 5. For example, the parking information processing device 11 determines that the vehicle 10 has arrived at the entrance/exit 61 of the parking lot 60 having no parking frames by notified from the automatic control device 12 that the vehicle has arrived at the entrance/exit 61 of the parking lot 60 having no parking frames.

First, the control unit 231 transmits an information demanding for the restriction information representing the current restricted area in the parking lot 60 where parking is restricted to the server 30 via the communication device 4 (step S201). The control unit 231 is an exemplary device acquisition unit.

The control unit 231 then acquires the restriction information of the parking lot 60 from the control unit 341 of the server 30 via the communication device 4 (step S202). The control unit 231 may acquire the terrain information representing the terrain of the parking lot 60 (e.g., the map information) together with the restriction information from the server 30. When the parking information processing device 11 or the automatic control device 12 has the terrain information representing the terrain of the parking lot 60, the parking information processing device 11 may also use this terrain information FIG. 6 is a diagram for explaining the restriction information. In the example shown in FIG. 6, the restriction information is represented by a table 100 in which the current restricted areas in the parking lot 60 are registered. The table 100 has a cell coordinates column 101 representing the cell coordinates and an occupancy column 102 representing the occupancy of the cells by a vehicle. The terrain of the parking lot 60 is divided into a plurality of the cells, and the coordinates of the respective cells are registered in the coordinates column 101. The restricted area is represented by the position of the cell represented by the cell coordinates. In the occupancy column 102, the probability of cell being occupied by a vehicle is registered. The occupancy of the cell corresponding to the restricted area is greater than zero. The occupancy of cells that are not the restricted area is zero. The occupancy indicates the probability of a position in the parking lot 60 corresponding to the cell is occupied by a vehicle. The probability 100% is registered as the occupancy for the cells corresponding to the parking position and the traveling route of the vehicle, for example.

In the example shown in FIG. 6, the current restriction information in which the vehicle 70 is parking in the parking lot 60 is registered in the table 100. In the cells representing the parking position P1 in which the vehicle 70 is parking, the occupancy 100% and the identifying information IP1 indicating the vehicle 70 which occupies the cell are registered. In addition, in the cells representing the traveling route R1 of the vehicle 70, the occupancy 100% and the identifying information IR1 indicating the vehicle 70 which occupies the traveling route R1 are registered.

The occupancy lower than 100% may be registered. This occurs when a new restricted area is generated by expanding the parking position and the traveling route based on the accuracy of the position of the vehicle. The cells representing the expanded area of the parking position and the traveling route are registered with the occupancy less than 100% based on the accuracy of the position of the vehicle.

Figure 7:
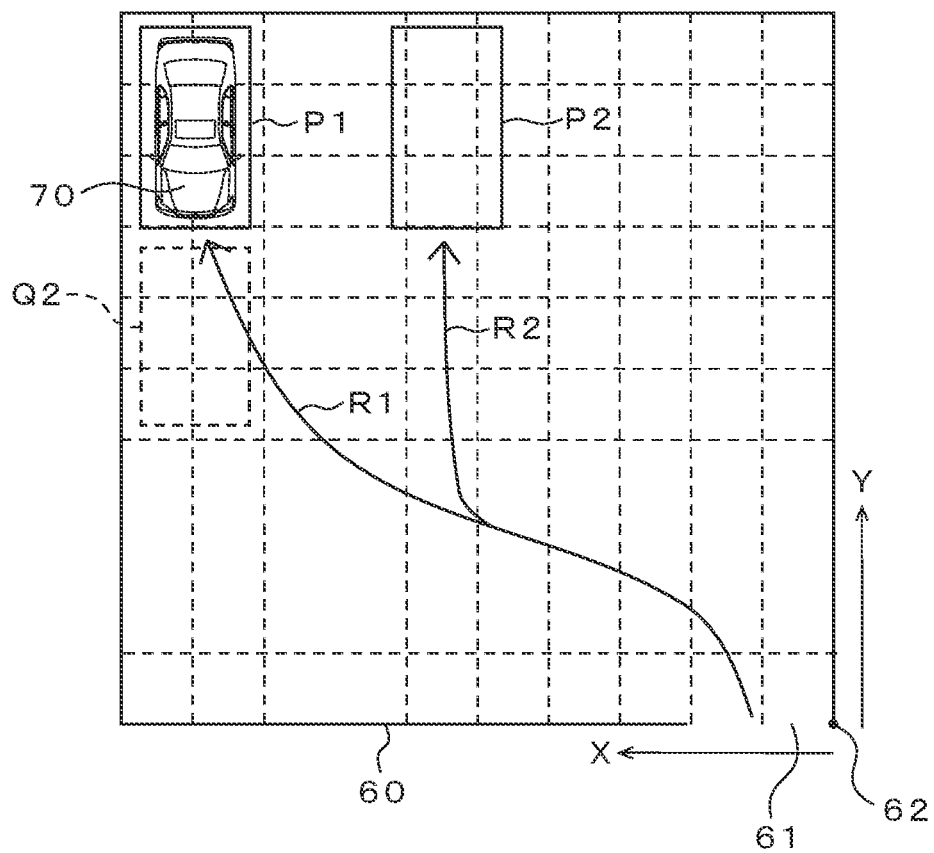
FIG. 7 is a diagram illustrating a terrain information associated with the restriction information.

The control unit 231 then associates the restriction information with the terrain information (step S203) and the series of processes is complete. FIG. 7 is a diagram illustrating the terrain information associated with the restriction information. The terrain information of the parking lot 60 and the restriction information of the parking lot 60 are associated to each other based on the reference position set out at the entrance/exit, etc. of the parking lot and orientations.

In the example shown in FIG. 7, the parking lot 60 has a rectangular shape and has a reference point 62 at the end of the entrance/exit 61. The reference point 62 is an exemplary reference position. The restriction information includes the position of the reference point 62, represented in the world coordinate system, and orientations of the X-axis and Y-axis.

The control unit 231 associates the restriction information with the terrain information by matching the origin of the cell coordinates with the reference point 62 included in the terrain information and by matching the positions of the X-axis and Y-axis of the cell coordinates with the corresponding positions of the terrain information. The cell coordinate is represented by the position of the cell in the X-axis direction and the Y-axis direction using the reference point 62 as the origin.

The area of the parking position P1 where the vehicle 70 is parking and the traveling route R1 of the vehicle 70 are represented in the world coordinate system, based on the terrain information of the parking lot 60 to which the restriction information is associated. The automatic control device 12 drives the vehicle 10 in the parking lot 60 based on the terrain information of the parking lot 60 to which the restriction information is associated.

In the example shown in FIG. 6, the parking position P1 where the vehicle 70 has already been parked in the parking lot 60 is represented by a plurality of the cells associated with the parking position P1, and the traveling route R1 of the vehicle 70 is represented by a plurality of the cells associated with the traveling route R1. In FIG. 6, the traveling route R1 is represented by one curved line, but in practice, the traveling route R1 has a width spanning a plurality of the cells.

Figure 8:
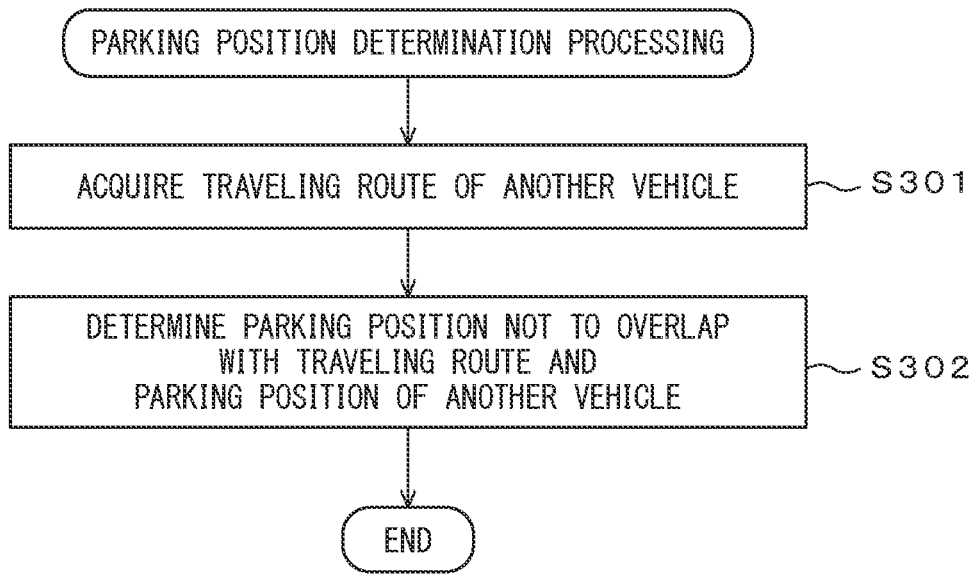
FIG. 8 is an exemplary operation flow chart relating to parking position determination processing of the parking information processing device.

FIG. 8 is an exemplary operation flow chart relating to parking position determination processing of the parking information processing device 11. Referring to FIG. 8, the parking position determination processing of the parking information processing device 11 will be described below. The parking information processing device 11 carries out the parking position determination processing according to the operation flow chart shown in FIG. 8 after associating the restriction information with the terrain information.

First, the determining unit 232 acquires the traveling route R1 and the parking position P1 of another vehicle 70 that has already been parked in the parking lot 60 based on the terrain information of the parking lot 60 to which the restriction information is associated (step S301). The traveling route R1 and the parking position P1 are represented by the terrain information as predetermined areas in the parking lot 60.

The determining unit 232 then determines the parking position P2 of the vehicle 10 so that the parking position P2 does not overlap with the traveling route R1 of the vehicle 70 and the parking position P1 of the vehicle 70 (step S302) and the series of processes is complete. The parking position P2 has a space in which the vehicle 10 can park. The dimensions of the vehicle 10 are stored in the memory 22. The parking position P2 is represented by the terrain information as a predetermined area in the parking lot 60.

For example, the determining unit 232 determines the parking position P2 within a predetermined area (e.g., within 5 meters) from the vehicle 70. Furthermore, the determining unit 232 estimates an orientation (front-rear direction) of the vehicle 70 parking in the parking lot 60 based on the current restriction information and determines the parking position P2 so that the vehicle 10 parks facing the same direction as the parking vehicle 70. The determining unit 232 stores the parking position P2 in the memory 22.

For example, if the parking position Q2 (see FIG. 7) of the vehicle 10 is determined so that the parking position Q2 overlaps with the traveling route R1 in the vicinity of the vehicle 70, the vehicle 70 will not be able to move from the parking position P1 to the entrance/exit 61. Therefore, the determining unit 232 determines the parking position P2 of the vehicle 10 so as not to overlap with the traveling route R1 of the vehicle 70 as described above. This allows the vehicle 10 to be parked so as not to obstruct the vehicle 70 exiting.

On the other hand, determining the parking position P2 of the vehicle 10 so as not to overlap with the traveling route R1 in all sections of the traveling route R1 of the vehicle 70 will narrow the scope of selecting the parking position P2. Accordingly, the determining unit 232 may determine the parking position P2 of the vehicle 10 so as not to overlap with the traveling route R1 and the parking position P1 within a predetermined range from the parking position P1 of the vehicle 70. The predetermined range may be between two and three times the longitudinal dimension (e.g., 5 meters) of a typical vehicle. This ensures a wide selection of the parking position P2 and allows the vehicle 10 to be parked so as not to obstruct the vehicle 70 exiting.

By parking the vehicle 10 aligned orientation with vehicle 70 in the vicinity of the vehicle 70, the vehicle 10 does not obstruct the traveling of the vehicle 70 when the vehicle 70 is exiting. Further, by parking the vehicle 10 aligned orientation with vehicle 70 in the vicinity of the vehicle 70, the vehicle 10 can leave a wider area where other vehicles can park after the vehicle 10 has parked.

When there are no other vehicles parked in the parking lot 60, the restriction information does not include any restricted area. In this case, the determining unit 232 may determine the parking position P2 at the end of the parking lot 60.

FIG. 9 is an exemplary operation flow chart relating to traveling route determination processing of the parking information processing device 11. The traveling route determination processing of the parking information processing device 11 will be described below with reference to FIG. 9. The parking information processing device 11 carries out the traveling route determination processing in accordance with the operation flow chart shown in FIG. 9 after determining the parking position.

First, the determining unit 232 acquires the traveling route R1 and the parking position P1 of another vehicle 70 that has already been parking in the parking lot 60 based on the terrain information of the parking lot 60 to which the restriction information is associated (step S401). The traveling route R1 and the parking position P1 are represented by the terrain information as predetermined areas in the parking lot 60.

The determining unit 232 then determines the traveling route R2 of the vehicle 10 based on the terrain information of the parking lot 60 to which the restriction information is associated (step S402) and the series of processes is complete. For example, the determining unit 232 determines the traveling route R2 of the vehicle 10 so that an overlapping portion of the traveling route R2 of the vehicle 10 with the traveling route R1 of the vehicle 70 becomes maximum, the distance for the vehicle 10 traveling from the entrance/exit 61 of the parking lot 60 to the parking position R2 becomes minimum, and the traveling route R2 does not overlap with the parking position P1. The traveling route R2 is represented by the terrain information as a predetermined area in the parking lot 60.

For example, the determining unit 232 determines the traveling route R2 of the vehicle 10 so that the number of which the cells corresponding to the traveling route R2 of the vehicle 10 coincide with the cells corresponding to the traveling route R1 becomes maximum, the number of cells corresponding to the traveling route R2 becomes minimum and the traveling route R2 does not overlap with the parking position P1. The determining unit 232 stores the traveling route R2 in the memory 22.

By overlapping the traveling route R2 of the vehicle 10 as much as possible with the traveling route R1 of the vehicle 70, the vehicle 10 can leave a wider area where other vehicles can park after the vehicle 10 has parked.

The determining unit 232 then notifies the automatic control device 12 of the information representing the parking position P2 and the traveling route R2, together with the terrain information of the parking lot 60. The automatic control device 12 drives the vehicle 10 from the entrance/exit 61 of the parking lot 60 to the parking position P2 based on the traveling route R2 and parks the vehicle 10 in the parking position P2. The automatic control device 12 notifies the parking information processing device 11 that the vehicle 10 has been parked in the parking position P2.

Since the automatic control device 12 drives the vehicle 10 based on the information, etc. representing objects detected around the vehicle 10, the vehicle 10 may be driven by changing the traveling route R2 when an object is detected. The automatic control device 12 stores the updated traveling route R2 in the memory 22 when the traveling route R2 was changed.

FIG. 10 is an exemplary operation flow chart relating to area information generating processing of the parking information processing device 11. Referring to FIG. 10, the area information generating processing of the parking information processing device 11 will be described below. The parking information processing device 11 carries out the area information generating processing in accordance with the operation flow chart shown in FIG. 10 after the vehicle 10 has parked in the parking position.

First, the generating unit 233 determines the restricted area based on the traveling route R2 and the parking position P2 of the vehicle 10 stored in the memory 22 (step S501). The generating unit 233 determines the area representing the traveling route R2 in the terrain information of the parking lot 60 as the restricted area representing the traveling route R2. The generating unit 233 also determines the area representing the parking position P2 in the terrain information of the parking lot 60 as the restricted area representing the parking position P2.

The generating unit 233 then generates the area information including the traveling route R2 and the parking position P2 as the new restricted area (step S502). The generating unit 233 generates the area information including the cell coordinates representing the cells corresponding to the restricted area representing the traveling route R2 and the parking position P2 and the occupancy. In the area information, the restricted area is expressed with the cell coordinates.

The occupancy of cells representing the restricted area is, for example, 100%.

Figure 11:
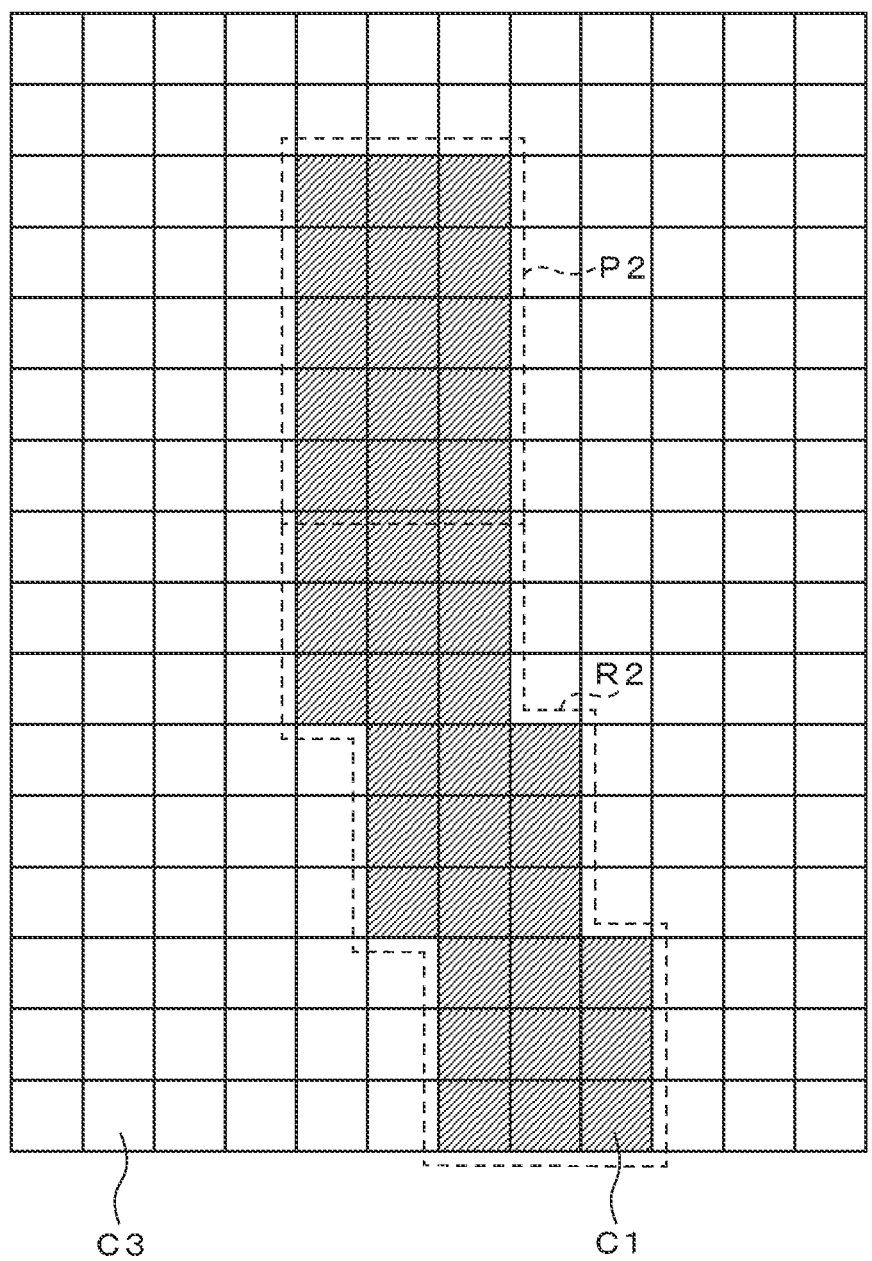
FIG. 11 is a diagram for explaining the area information (Part 1).

FIG. 11 is a diagram for explaining the area information. FIG. 11 shows the area information associated with a portion of the parking lot 60 as a grid-map. In the grid map, each of the plurality of the cells is arranged according to the cell coordinates, and the occupancy of each cell is indicated by a pattern.

The parking position P2 is represented by a plurality of the cells C1 indicating that the occupancy is 100%. The traveling route R2 is also represented by a plurality of the cells C1 indicating that the occupancy is 100%. On the other hand, areas other than the parking position P2 and the traveling route R2 are represented by cells C3 of the occupancy 0%. The area information may have only the cell coordinates of the cells with non-zero occupancy.

Here, the generating unit 233 may expand the parking position P2 and the traveling route R2 based on the accuracy of the position of the vehicle 10 to generate the restricted area. The accuracy of the position of the vehicle 10 is determined based on, for example, the accuracy of GNSS position notified from the automatic control device 12. Further, the lower the accuracy of the position of the vehicle 10, the degree to which the restricted area is expanded is increased. The lower accuracy of the position of the vehicle 10, the higher the occupancy of the expanded cell.

Figure 12:
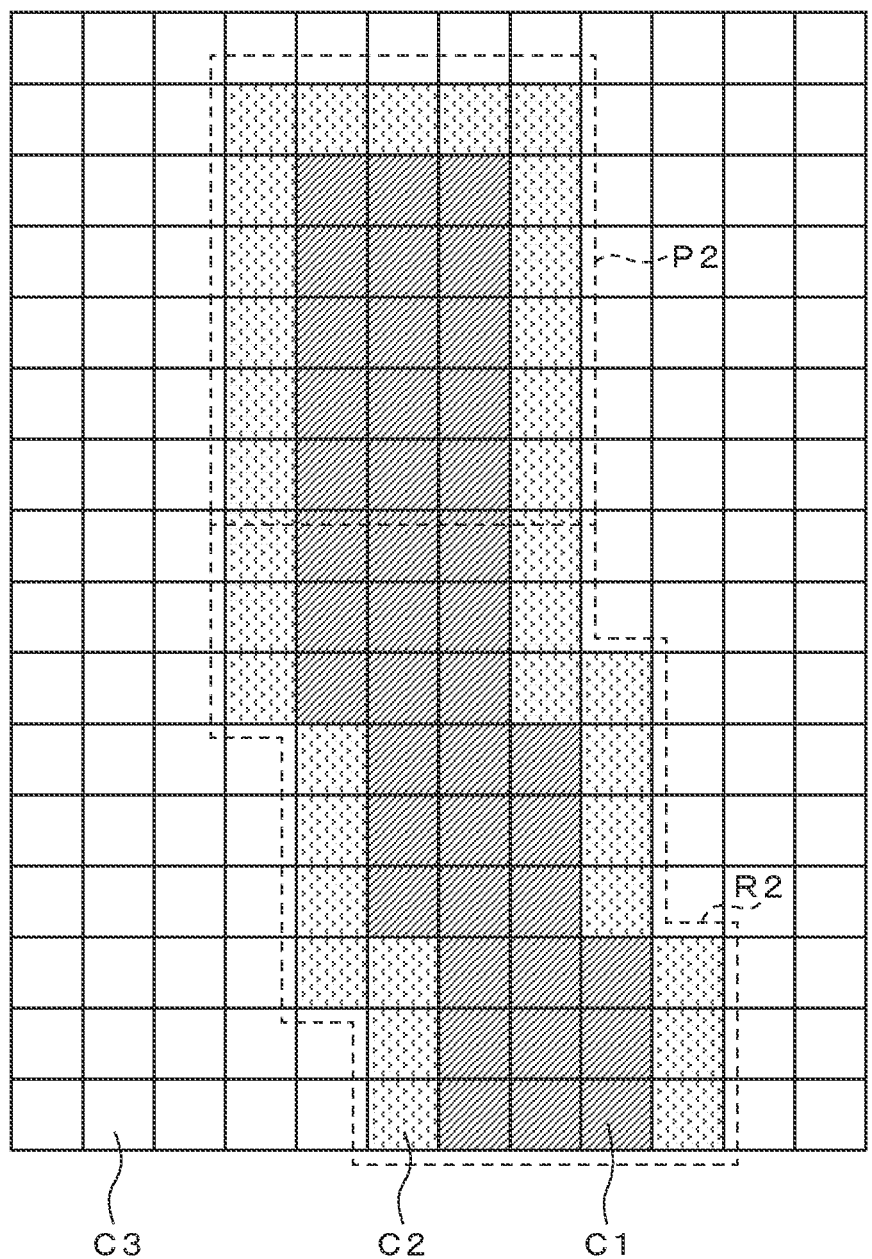
FIG. 12 is a diagram for explaining the area information (Part 2).

FIG. 12 is a diagram for explaining another area information. The parking position P2 and the traveling route R2 are expanded by one cell. The parking position P2 is represented by a plurality of the cells C1 indicating that the occupancy is 100% and a plurality of the cells C2 arranged around these cells C1 indicating that the occupancy is 30%. Similarly, the traveling route R2 is represented by a plurality of the cells C1 indicating that the occupancy is 100% and a plurality of the cells C2 arranged around these cells C1 indicating that the occupancy is 30%.

The control unit 231 then transmits the area information including the new restricted area via the communication device 4 to the server 30 (step S503) and the series of the processes is complete. The control unit 231 is an exemplary output unit or device output unit.

Figure 13:
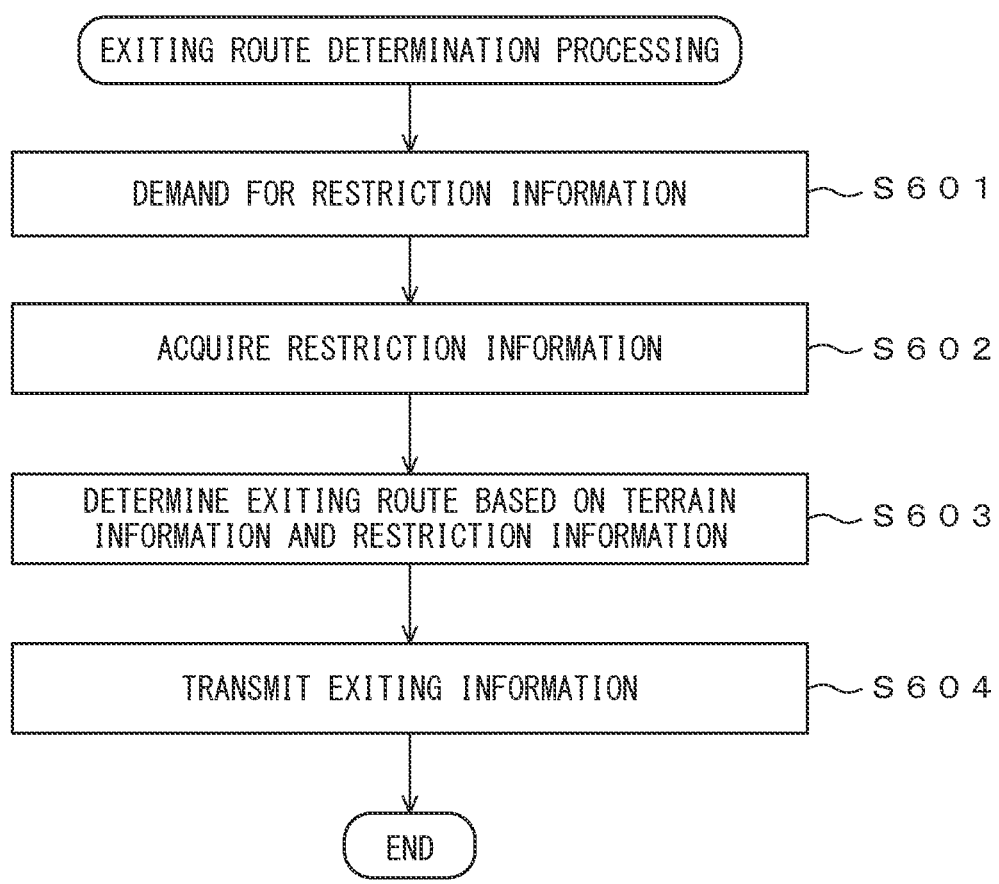
FIG. 13 is an exemplary operation flow chart relating to exiting route determination processing of the parking information processing device.

FIG. 13 is an exemplary operation flow chart relating to exiting route determination processing of the parking information processing device 11. Referring to FIG. 13, the exiting route determination processing of the parking information processing device 11 will be described below. The parking information processing device 11 carries out the exiting route determination processing in accordance with the operation flow chart shown in FIG. 13 as the vehicle 10 exits the parking lot 60. For example, the automatic control device 12 notifies the parking information processing device 11 of a request to carry out the exiting route determination processing prior to causing the vehicle 10 to exit from the parking position P2.

First, the control unit 231 transmits the information request demanding for the restriction information representing the current restricted area where parking is restricted in the parking lot 60 via the communication device 4 to the server 30 (step S601). Since new another vehicle may be parked in the parking lot 60, or another vehicle that had already been parked has exited during the vehicle 10 is parking, the restriction information may be updated. Therefore, the control unit 231 acquires the most recent restriction information.

The control unit 231 then acquires the restriction information of the parking lot 60 from the server 30 via the communication device 4 (step S602).

The determining unit 232 then determines the exiting route from the parking position P2 to entrance/exit 61 of the parking lot 60 based on the terrain information and the restriction information (step S603). For example, the determining unit 232 determines the exiting route so that the exiting route does not overlap with the parking position P1 of another vehicle 70. The exiting route is represented by the terrain information as a predetermined area in the parking lot 60.

The determining unit 232 notifies the automatic control device 12 of the exiting route. The automatic control device 12 drives the vehicle 10 and move the vehicle 10 to the entrance/exit 61 of the parking lot 60 based on the exiting route. The automatic control device 12 notifies the parking information processing device 11 that the vehicle 10 has arrived at the entrance/exit 61 of the parking lot 60.

The generating unit 233 then transmits the exiting information representing that the vehicle 10 has exited the parking lot 60 via the communication device 4 to the server 30 (step S604), and the series of the processes is complete. The server 30 carries out the restriction information updating processing based on the exiting information. The restriction information updating processing by the server 30 will be described later.

Figure 14:
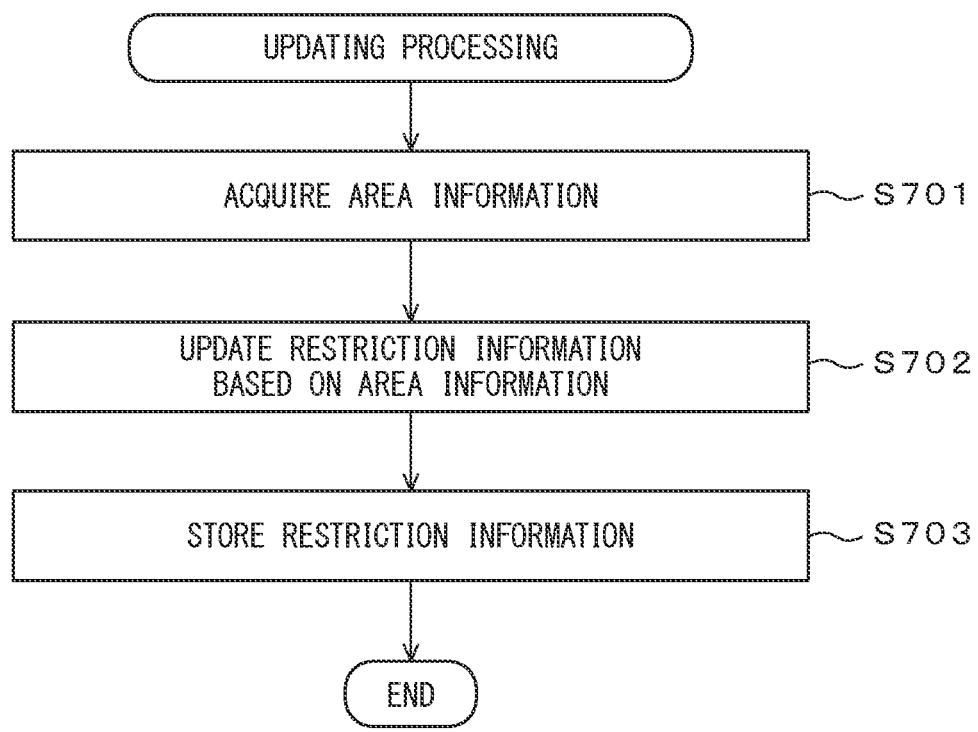
FIG. 14 is an exemplary operation flow chart relating to updating processing of the server (Part 1).

FIG. 14 is an exemplary operation flow chart relating to updating processing of the restriction information by the server 30. Referring to FIG. 14, the updating processing of the restriction information by the server 30 will be described. Each time the server 30 acquires the area information from the parking information processing device 11, the server 30 carries out the updating processing according to the operation flowchart shown in FIG. 14.

First, the control unit 341 acquires the area information including the new restricted area of the parking lot 60 from the parking information processing device 11 via the communication IF 31 (step S701). The control unit 341 is an exemplary server acquisition unit.

Figure 15:
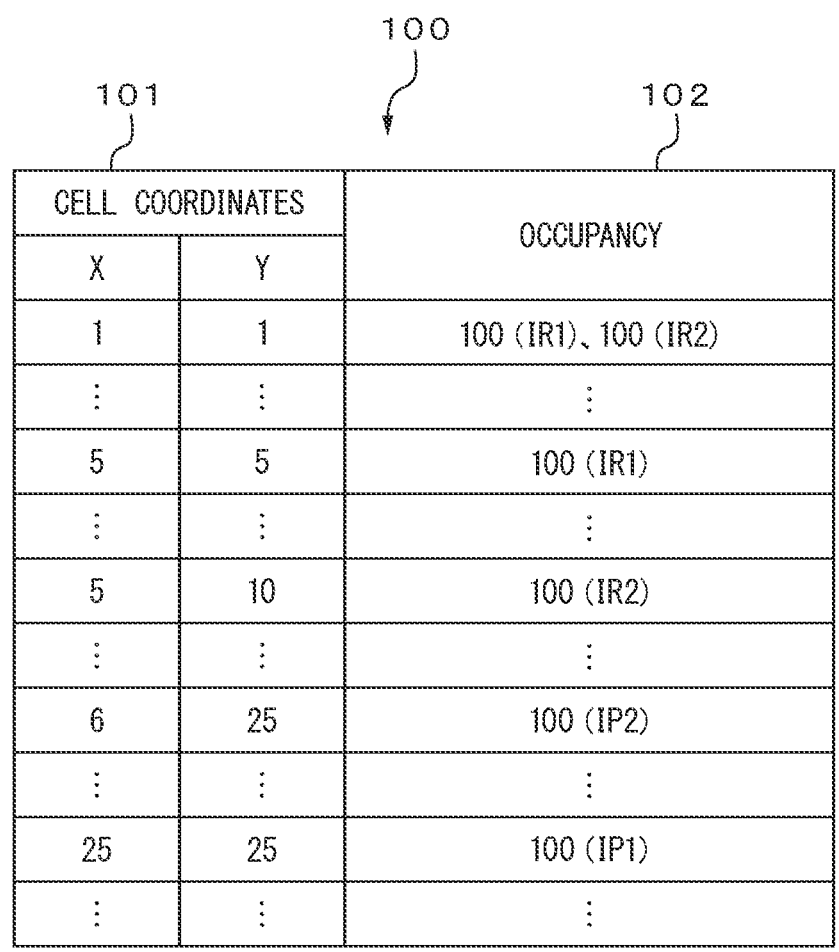
FIG. 15 is a diagram for explaining the restriction information (Part 2).

The updating unit 342 then updates the restriction information 321 stored in the storage device 32 based on the area information (step S702). FIG. 15 is a diagram for explaining the restriction information. This FIG. 15 shows an example in which the restriction information shown in FIG. 6 is updated.

The updating unit 342 updates the restriction information 321 stored in the storage device 32 so as to add the information of the cell which occupancy is non-zero based on the area information acquired from the parking information processing device 11

In the example shown in FIG. 6, it has been registered that the occupancy of the traveling route R1 of the vehicle 70 is 100% in the occupancy column 102 represented by the cell coordinates (1, 1). In the example shown in FIG. 15, it is newly registered that the occupancy of the traveling route R2 of the vehicle 10 is 100% in the occupancy column 102 represented by the cell coordinates (1, 1).

The traveling route R1 of the vehicle 70 and the traveling route R2 of the vehicle 10 may partially overlap. In this case, the occupancy of the two vehicles is registered in the same cell. When the parking position of one vehicle has been expanded (see FIG. 12), the expanded cells may also overlap with the parking position of another vehicle.

In the example shown in FIG. 15, it is newly registered that the occupancy of the traveling route R2 of the vehicle 10 is 100% in the occupancy column 102 represented by the cell coordinates (5, 10). In the example shown in FIG. 15, it is newly registered that the occupancy of the parking position P2 of the vehicle 10 is 100% in the occupancy column 102 represented by the cell coordinates (6, 25).

The updating unit 342 then stores the updated restriction information 321 in the storage device 32 (step S703) and the series of processes is complete.

When the control unit 341 of the server 30 outputs the restriction information in accordance with the information request from the parking information processing device 11 (see step S102), the highest occupancy is output as the restriction information for this cell when the occupancy of a plurality of the vehicles is registered in one cell. Thus, it is possible to reduce the communication traffic.

Figure 16:
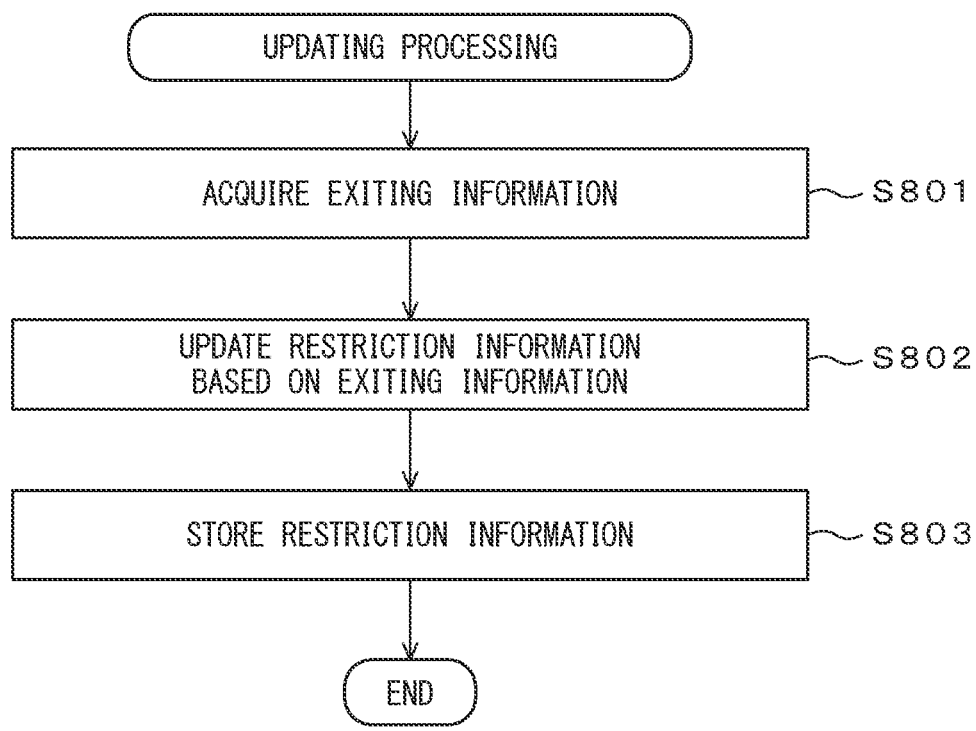
FIG. 16 is an exemplary operation flow chart relating to updating processing of the server (Part 2).

FIG. 16 is an exemplary operation flow chart of another updating processing of the restricted information by the server 30. Referring to FIG. 16, another updating processing of the server 30 will be described below. Each time the server 30 acquires the exiting information from the parking information processing device 11, the server 30 carries out the updating processing according to the operation flowchart shown in FIG. 16.

First, the control unit 341 acquires the exiting information from the parking information processing device 11 via the communication IF 31 (step S801).

The updating unit 342 then updates the restriction information 321 stored in the storage device 32 based on the exiting information (step S802). The updating unit 342 deletes the information related to the identifying information of the vehicle 10 from the restriction information 321.

For example, when the restriction information 321 shown in FIG. 15 is stored in the storage device 32, the restriction information shown in FIG. 6 is obtained after the information related to the identification information of the vehicle 10 is deleted and the restriction information 321 is updated.

The updating unit 342 then stores the updated restriction information 321 in the storage device 32 (step S803) and the series of processes is complete.

According to the parking information processing system of the present embodiment described in detail above, it can park the host vehicle not to park the host vehicle on the traveling route for another vehicle which has already been parked exiting from the parking lot having no parking frames and not to obstruct another vehicle exiting from the parking lot.

In the present disclosure, the parking information processing device, computer program for processing parking information, method for processing parking information, parking information processing system and parking information processing server according to the embodiment described above may incorporate appropriate modifications that are still within the gist of the disclosure. Moreover, the technical scope of the disclosure is not limited to these embodiments, and includes the disclosure and its equivalents as laid out in the Claims.

For example, in the above-described embodiment, the terrain information of the parking lot was the map information, but the terrain information of the parking lot may be acquired using a sensor such as a camera, etc. mounted on the vehicle 10. In this case, in embodiments, the terrain information of the parking lot and the restriction information of the parking lot are related to each other based on the reference position and orientation set out in the entrance/exit of the parking lot.

The invention claimed is:

1. A parking information processing device comprising:
a processor configured to:
acquire restriction information representing a current restricted area where parking is restricted in a parking lot having no parking frames at an entrance/exit of the parking lot from a server via a device communication unit, wherein the restriction information includes a table that includes registered current restricted areas, a cell coordinates column and an occupancy column, and a probability of a cell being occupied by a host vehicle or another vehicle,
determine a first parking position for parking the host vehicle in the parking lot based on terrain information representing terrain of the parking lot and the restriction information, wherein the host vehicle is an autonomous vehicle,
associate the restriction information with the terrain information by matching an origin of cell coordinates with a reference point included in the terrain information, and by matching positions of an X-axis and a Y-axis of the cell coordinates with corresponding positions of the terrain information,
generate area information including a first traveling route for the host vehicle traveled from the entrance/exit of the parking lot to the first parking position and the first parking position as a new restricted area, and
output the area information to the server via the device communication unit.

2. The parking information processing device according to claim 1, wherein
the restriction information further includes a second traveling route for the another vehicle traveled from the entrance/exit of the parking lot to a second parking position where the another vehicle is parking and the second parking position as the current restricted area, and
the processor is further configured to determine the first parking position not to overlap with the second traveling route and the second parking position.

3. The parking information processing device according to claim 2, wherein the processor is further configured to determine the first parking position not to overlap with the second traveling route and the second parking position within a predetermined range from the second parking position.

4. The parking information processing device according to claim 2, wherein the processor is further configured to determine the first traveling route so that an overlapping portion of the first traveling route with the second traveling route becomes maximum, the distance for the host vehicle traveling from the entrance/exit of the parking lot to the first parking position becomes minimum, and the first traveling route does not overlap with the second parking position.

5. The parking information processing device according to claim 2, wherein the processor is further configured to estimate an orientation of the another vehicle parking in the parking lot based on the current restriction information and determine the first parking position so that the host vehicle parks facing the same direction as the another vehicle.

6. The parking information processing device according to claim 1, wherein the processor is further configured to expand the first parking position and the first traveling route based on accuracy of the position of the host vehicle to generate the new restricted area.

7. The parking information processing device according to claim 1, wherein the first traveling route of the host vehicle and a second traveling route of the another vehicle partially overlap with each other.

8. A computer-readable, non-transitory storage medium storing a computer program for processing parking information, which causes a processor to execute a process, the process comprising:
acquiring restriction information representing a current restricted area where parking is restricted in a parking lot having no parking frames at an entrance/exit of the parking lot from a server via a device communication unit, wherein the restriction information includes a table that includes registered current restricted areas, a cell coordinates column and an occupancy column, and a probability of a cell being occupied by a host vehicle or another vehicle;

determining a first parking position for parking the host vehicle in the parking lot based on terrain information representing terrain of the parking lot and the restriction information, wherein the host vehicle is an autonomous vehicle;

associating the restriction information with the terrain information by matching an origin of cell coordinates with a reference point included in the terrain information, and by matching positions of an X-axis and a Y-axis of the cell coordinates with corresponding positions of the terrain information;

generating area information including a first traveling route for the host vehicle traveled from the entrance/exit of the parking lot to the first parking position and the first parking position as a new restricted area; and outputting the area information to the server via the device communication unit.

9. A method for processing parking information carried out by a parking information processing device, the method comprising:

acquiring restriction information representing a current restricted area where parking is restricted in a parking lot having no parking frames at an entrance/exit of the parking lot from a server via a device communication unit, wherein the restriction information includes a table that includes registered current restricted areas, a cell coordinates column and an occupancy column, and a probability of a cell being occupied by a host vehicle or another vehicle;

determining a first parking position for parking the host vehicle in the parking lot based on terrain information representing terrain of the parking lot and the restriction information, wherein the host vehicle is an autonomous vehicle;

associating the restriction information with the terrain information by matching an origin of cell coordinates with a reference point included in the terrain information, and by matching positions of an X-axis and a Y-axis of the cell coordinates with corresponding positions of the terrain information;

generating area information including a first traveling route for the host vehicle traveled from the entrance/exit of the parking lot to the first parking position and the first parking position as a new restricted area; and outputting the area information to the server via the device communication unit.

10. A parking information processing system comprising:
a server comprising:
a server communication device;
a storage device storing restriction information representing a current restricted area where parking is restricted in a parking lot having no parking frames, wherein the restriction information includes a table that includes registered current restricted areas, a cell coordinates column and an occupancy column, and a probability of a cell being occupied by a host vehicle or another vehicle; and a first processor configured to:
output the restriction information stored in the storage device via the server communication device,
acquire area information representing a new restricted area via the server communication device, and
update the restriction information stored in the storage device based on the area information; and
a parking information processing device comprising:
a second processor configured to;
acquire the restriction information at an entrance/exit of the parking lot from the server via a device communication unit,
determine a first parking position for parking the host vehicle in the parking lot based on terrain information representing terrain of the parking lot and the restriction information, wherein the host vehicle is an autonomous vehicle,
associate the restriction information with the terrain information by matching an origin of cell coordinates with a reference point included in the terrain information, and by matching positions of an X-axis and a Y-axis of the cell coordinates with corresponding positions of the terrain information,
generate the area information including a first traveling route for the host vehicle traveled from the entrance/exit of the parking lot to the first parking position and the first parking position as a new restricted area, and
output the area information to the server via the device communication unit.

11. A parking information processing server comprising:
a server communication device;
a storage device storing restriction information representing a current restricted area where parking is restricted in a parking lot having no parking frames, wherein the restriction information includes a table that includes registered current restricted areas, a cell coordinates column and an occupancy column, and a probability of a cell being occupied by a first vehicle or another vehicle; and
a first processor configured to:
output, to a second processor of a parking information processing device, the restriction information stored in the storage device via the server communication device,
acquire area information including a traveling route for the first vehicle traveled from the entrance/exit of the parking lot to a parking position and the parking position as a new restricted are via the server communication device, wherein the first vehicle is an autonomous vehicle, and
update the restriction information stored in the storage device based on the area information, wherein
the second processor of the parking information processing device is configured to associate the restriction information with the terrain information by matching an origin of cell coordinates with a reference point included in the terrain information, and by matching positions of an X-axis and a Y-axis of the cell coordinates with corresponding positions of the terrain information.

* * * * *